United States Patent Office 2,808,391
Patented Oct. 1, 1957

2,808,391

POLYALKYLENE ETHER-POLYURETHANE POLYMERS CONTAINING ETHYLENICALLY UNSATURATED SIDE CHAINS

Dexter B. Pattison, Wilmington, Del., assignor to E. I. du Pont de Nemours and Company, Wilmington, Del., a corporation of Delaware No Drawing. Application July 2, 1956, Serial No. 595,111

21 Claims. (Cl. 260—77.5)

This invention relates to novel polyurethane elastomers, and more particularly to polyurethane elastomers having side chains containing aliphatic C=C groups, which may be cured by sulfur.

Heretofore, various valuable elastomeric condensation products have been prepared and cured by using various polyisocyanates. As typical of the many methods has been the preparation of an elastomer from a polyalkyleneether glycol, an organic diisocyanate and a chain extending agent. Other glycols, such as polyalkyleneetherthioether glycols, polyalkylene-aryleneether glycols, and polyalkylene-aryleneether-thioether glycols, have been used. All of these elastomers have exhibited outstanding properties such as abrasion resistance and low temperature properties. However, they have generally been found to be somewhat deficient in regard to bin scorch, resistance to boiling water and thermal stability at high temperatures and adversely affected by moisture absorption during compounding. It would, therefore, be highly desirable to be able to provide a polyurethane elastomer which would combine the advantages of natural rubber with those of the polyurethanes.

It is an object of the present invention to provide novel polyurethane elastomers. A further object is to provide polyurethane elastomers having side chains which contain aliphatic C=C groups which may be cured by sulfur. A still further object is to provide a process for the preparation of these novel polyurethane elastomers. Other objects will appear hereinafter.

These and other objects of the following invention are accomplished by the novel polymeric polyurethanes consisting essentially of the recurring structural units

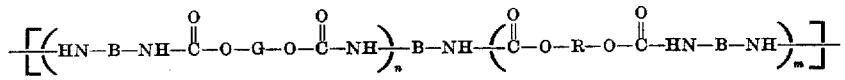

wherein O—G—O is a bivalent radical resulting from removal of the terminal hydrogen atoms from a polymeric glycol having a molecular weight of at least 750 and being selected from the group consisting of polyalkyleneether glycols, polyalkyleneether-thioether glycols, polyalkylene-aryleneether glycols, and polyalkylene-aryleneether-thioether glycols; B is a bivalent organic radical, said radical being inert to isocyanate groups; O—R—O is a bivalent radical resulting from removal of the terminal hydrogen atoms from a non-polymeric glycol; $n$ is an integer greater than zero; $m$ is an integer including zero; each of the structural units being connected to the next by a radical selected from the group consisting of

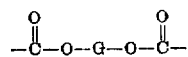

and

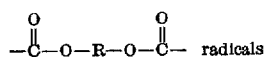 radicals wherein O—G—O and O—R—O have the significance defined above; with at least 60% of the total weight of the polymer being the bivalent radicals O—G—O; with the proviso that at least one of the bivalent O—G—O, B and O—R—O radicals have a side chain containing an aliphatic

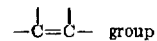 group with the remaining valences on the carbon atoms of said group being satisfied by monovalent substituents, said side chain occurring at least once for every 8000 units of molecular weight of said polymeric polyurethane.

The polymeric polyurethanes of the present invention may be conveniently prepared by several general procedures. Thus, a polymeric glycol, such as a polyalkyleneether glycol, an organic diisocyanate and a low molecular weight, non-polymeric glycol, with the ratio of the diisocyanate to the sum of the polymeric and nonpolymeric glycols being substantially equimolar, may be reacted together to prepare polymers within the scope of the present invention. The polymeric glycol may be reacted first with a molar excess of the organic diisocyanate so as to form an isocyanate-terminated polymer and this reaction may then be followed by a chain extension step with the low molecular weight, non-polymeric glycol. Another method which may be used is to first react the low molecular weight, non-polymeric glycol with a molar excess of an organic diisocyanate and then react the resulting isocyanate-terminated product with the polymeric glycol. It is to be understood that in following these procedures, the polymeric glycol, organic diisocyanate and low molecular weight, non-polymeric glycol need not necessarily be the same in each instance in the preparation of any given polymer. Since the present invention is directed to polymeric polyurethanes having side chains which contain aliphatic

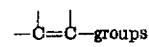 groups these side chains may be present on any one of the reactants which are used. The side chains serve as potential curing sites and the polymer may, therefore, be conveniently cured by application of a sulfur curing procedure. It is also possible to prepare polymers within the scope of the present invention by reacting a polymeric glycol with a substantially equimolar proportion of an

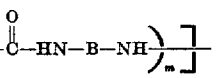

organic diisocyanate with the side chain containing the aliphatic

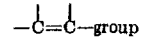 group on either one or both of these reactants. Another method which may be used is to react a mixture of two or more different polymeric glycols, such as a polyalkyleneether glycol and a polyalkyleneether-thioether glycol, with the organic diisocyanate, followed by the reaction with a low molecular weight, non-polymeric glycol, or to react one of the polymeric glycols with the organic diisocyanate, so as to prepare an isocyanate-terminated polymer, followed by the reaction with a different polymeric glycol. Here again any one or all of these reactants may have the side chain which contains the aliphatic

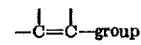 group

In a similar manner the bis-chloroformates of the polymeric glycol and of the non-polymeric glycol may be prepared and these then may be reacted with a substantially equimolar amount of an organic diamine having the side chain which contains an aliphatic

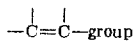—group present on either the bis-chloroformates or the diamine reactant. It is quite obvious that various modifications of any of the processes may be made in order to prepare the polymeric polyurethanes within the scope of the present invention.

When preparing the polymers of the present invention by the reaction of glycols with diisocyanates, various high molecular weight, polymeric glycols, such as polyalkyleneether glycols, polyalkyleneether-thioether glycols, polyalkylene-aryleneether glycols, and polyalkylene-aryleneether-thioether glycols, may be used. These polymeric glycols should have molecular weights of at least 750; however, they may be as high as about 10,000. In general, molecular weights of 750 to 5000 are preferred. It is to be understood that any of these polymeric glycols may have side chains containing aliphatic

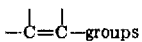—groups and when they do, the molecular weights will be increased in accordance with the molecular weights of the side chain groups.

In general, the polyalkyleneether glycols are preferred. These compounds may be represented by the formula HO(GO)$_n$H, wherein G is an alkylene radical and $n$ is an integer sufficiently large that the polyalkyleneether glycol has a molecular weight of at least 750. Not all of the alkylene radicals present need be the same. These compounds are ordinarily derived by the polymerization of cyclic ethers such as alkyleneoxides or dioxolane or by the condensation of glycols. The preferred polyalkyleneether glycol is polytetramethyleneether glycol, also known as polybutyleneether glycol. Polyethyleneether glycol, polypropyleneether glycol, 1,2-polydimethylethyleneether glycol and polydecamethyleneether glycol are other typical representatives of this class. Polyalkyleneether glycols having side chains which contain aliphatic C=C groups may be prepared by copolymerizing tetrahydrofuran with butadiene monooxide, as more particularly described in German Patent No. 914,438.

The polyalkyleneether-thioether glycols may be represented by the formula HO(QY)$_n$H, wherein Q represents hydrocarbon radicals at least some of which are alkylene, Y represents chalcogen atoms some of which are sulfur and the rest oxygen, and $n$ is an integer sufficiently large so that the glycol has a molecular weight of at least 750. These glycols may be conveniently prepared by condensing together various glycols and thiodiglycol in the presence of a catalyst such as p-toluene sulfonic acid.

The polyalkylene-aryleneether glycols are similar to the polyalkyleneether glycols except that some arylene radicals are present. Part of the ether oxygens may be replaced with sulfur. In general, the phenylene and naphthylene radicals are preferred with or without substituents such as alkyl or alkylene groups.

Any of a wide variety of organic diisocyanates may be employed to react with the glycols, including aromatic, aliphatic and cycloaliphatic diisocyanates and combinations of these types. It is to be understood that mixtures of two or more organic diisocyanates may be used. Representative compounds include toluene-2,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4-4'-methylene-bis-(cyclohexyl isocyanate) and 1,5-tetrahydronaphthylene diisocyanate. Arylene diisocyanates, i. e., those in which each of the two isocyanate groups is attached directly to an aromatic ring, are preferred. Compounds such as toluene-2,4-diisocyanate in which the two isocyanate groups differ in reactivity are particularly desirable. The diisocyanates may contain other substituents, although those which are free from reactive groups other than the two isocyanate groups are ordinarily preferred. As mentioned above, the organic diisocyanates may have side chains containing aliphatic

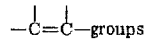—groups and aromatic diisocyanates with these side chains may be prepared by the process described in U. S. P. 2,647,884 by starting with diamines such as 4-allyloxy-m-phenylene diamine instead of a monoamine. In the case of the aromatic compounds, the isocyanate groups may be attached either to the same or to different rings. In the above recited general formula, the radicals which are derived from the organic diisocyanates have been represented by the letter B, and B is defined as being a bivalent organic radical which is inert to isocyanate groups. This limitation has been imposed on this bivalent radical since it is obvious that this radical may not contain groups which are reactive with isocyanate groups.

When the polymeric polyurethanes of the present invention are prepared by reacting substantially equimolar amounts of one or more polymeric glycols with one or more organic diisocyanates, the polymer will be essentially characterized by the recurring structural units

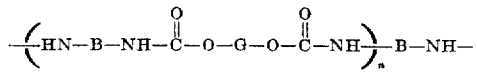

wherein O—G—O, B and $n$ have the significance defined above; with each of the structural units being connected to the next by a radical

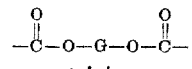

with the side chains containing an aliphatic

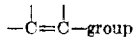—group being present on either one or both of the B or O—G—O radicals. It is readily apparent that if an organic diisocyanate such as 4-allyloxy-m-phenylene diisocyanate is used, a side chain allyloxy group will be present on the B radical; whereas if the polymeric glycol reactant has a side chain containing an aliphatic

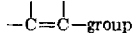—group this side chain will be present on the O—G—O radical. It is also apparent that if mixtures of two or more different polymeric glycol reactants are used, the O—G—O radicals will not be the same in each recurring structural unit.

When preparing these polymers by the reaction of polymeric glycols with organic diisocyanates, it is to be understood that other low molecular weight, non-polymeric glycols may be present. These reactants should have molecular weights below about 200 and they may have the side chains containing the aliphatic

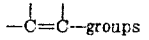—groups

In general, any low molecular weight, non-polymeric glycol may be used and these glycols may be entirely aliphatic, or may contain aromatic or cycloaliphatic constituents. Representative non-polymeric glycols having side chains containing aliphatic

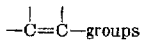—groups include 4-methyl-3-cyclohexene-1,1-dimethanol, 3-cyclohexene-1,1-dimethanol, 3-allyloxy-1,5-pentanediol, 3-(allyloxy)-1,2-propanediol, 2-[(allyloxy)-methyl]-2-methyl-1,3-propanediol, 2-vinyl-1,3-propanediol, 3-(2-methylallyloxy)-1,2-propanediol, 2,2'-(4-allyl-m-phenylenedioxy)-diethanol, 3-(o-allylphenoxy)-1,2-propanediol, 2-[(allyloxy)ethyl]-1,3-propanediol, 2-methyl-2-[(4-pentenyloxy)methyl]-1,3-propanediol, 2-[(allyloxy)ethyl]-2-methyl- 1,3-propanediol, 2-methyl-2-[(10-undecenyloxy)-methyl]-1,3-propanediol, 2,2'-(allylimino)-diethanol, 2-[(3-methylallyloxy)methyl]-2-methyl-1,3-propanediol, 2-[(allyloxy)methyl]-1,3-propanediol, 3-(o-propenylphenoxy)-1,2-propanediol, 3-(p-propenylphenoxy)-1,2-propanediol, and 3-(4-allyl-2-methoxyphenoxy)-1,2-propanediol. For purposes of the present invention, the 1,3-propanediols of the formula

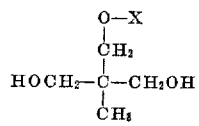

wherein X is a hydrocarbon radical bearing a terminal aliphatic —CH=CH₂ group, are of particular value.

When a low molecular weight, non-polymeric glycol reactant is used to prepare the polymeric polyurethanes of the present invention, several procedures may be used. One of these involves the reaction of a molar excess of organic diisocyanate with the non-polymeric glycol so as to provide an isocyanate-terminated product. This product is then reacted with the poylmeric glycol reactant. Another procedure is to react the polymeric glycol with a molar excess of the organic diisocyanate so as to provide an isocyanate-terminated polymer. The non-polymeric glycol is then used to chain extend this isocyanate-terminated polymer and to react with any free organic diisocyanate which may be present. It is readily apparent that in any of these procedures, urethane groups are formed by reaction of the terminal hydroxyl groups of the glycol with the terminal isocyanate groups of the organic diisocyanate.

When reacting the glycols, i. e., both the polymeric and the non-polymeric, with the organic diisocyanate, the reactants may be mixed together in substantially equimolar proportions, i. e., equimolar proportions of hydroxyl to isocyanate groups, in any suitable mixing equipment, at a temperature of from about 70 to 120° C. until substantially all of the isocyanate groups have reacted with the hydroxyl groups of the glycol. It is to be understood that the reaction will go faster at higher temperatures and the reaction can be speeded up by using a tertiary amine catalyst. It is desirable to use substantially equimolar proportions since an appreciable amount of free isocyanate groups after the reaction should be avoided as they will tend to react with the moisture in the air or react with active hydrogen atoms in the polymeric polyurethane and may cause premature gelation. It is necessary that the reaction be carried out under substantially anhydrous conditions and that the glycol reactants contain less than about 0.05 percent of water. This limitation is imposed because of the fact that with more water present, there will probably be urea groups formed by the reaction of the diisocyanate with the water and this will result in a gradual decrease in the thermal stability of the polymer. The product at this stage of the reaction is a substantially linear polymeric product in the form of a somewhat plastoelastic homogeneous solid. Substantially all of the isocyanate groups have been used up by reaction with the hydroxyl groups of the glycols. Since the product has side chains containing aliphatic

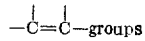

said side chains having been introduced by any one of the reactants, the product may be conveniently cured by using a sulfur curing procedure.

As mentioned above, the polymers of the present invention may also be prepared by reacting the bis-chloroformate of the polymeric glycol with an organic diamine and optionally with a bis-chloroformate of a low molecular weight, non-polymeric glycol. The side chains containing the aliphatic

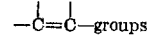

may be present on any one or more of these reactants. The bis-chloroformates of the polymeric glycols may be represented by the formula, Cl—COO—G—OOC—Cl, wherein G is a bivalent organic radical having a molecular weight of at least 716. These compounds may be prepared by using conventional methods of preparation, i. e., reacting a high molecular weight glycol having the formula HO—G—OH, with phosgene. The bis-chloroformates of polyalkyleneether glycols, polyalkyleneether-thioether glycols, polyalkylene-aryleneether glycols, and polyalkylene-aryleneether-thioether glycols may conveniently be prepared by this method. The bis-chloroformates of the low molecular weight, non-polymeric glycols may also be prepared by the same general procedure. These low molecular weight glycols may be entirely aliphatic or may contain aromatic or cycloaliphatic constituents and should preferably have molecular weights of below about 200. Representative non-polymeric glycols which may be used to form the bis-chloroformates have been listed above.

The organic primary diamines which may be used to react with the bis-chloroformates to form the novel polyurethanes of the present invention may be any aliphatic, aromatic or cycloaliphatic type. Representative diamines include ethylene diamine, hexamethylene diamine, m-tolylene diamine, 4.4'-methylene diphenylamine, benzidine and 1,4-cyclohexane diamine. The diamines may have side chains containing aliphatic

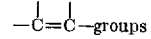

for example, 4-allyloxy-m-phenylene diamine may be used, which is obtained as an intermediate in the preparation of 4-allyloxy-m-phenylene diisocyanate, which is mentioned above.

In order that the polyurethanes of the present invention possess the desired elastomeric properties, they should be comprised of at least 60% by weight of the radicals obtained from the polymeric glycol reactants, either in the form of the glycol itself or that of the bis-chloroformate. In the preferred products of this invention, these polymeric radicals comprise from about 60 to 95% of the total weight of the product.

Since the polymeric polyurethanes of the present invention have side chains containing aliphatic

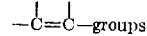

and these side chains serve as potential cross-linking sites, the preparation of these polyurethanes should be carried out so that on the average there is one side chain containing an aliphatic

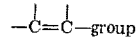

for at least every 8000 units of molecular weight of product so that the product can be effectively cured. It is to be understood that there may be more cross linking sites present and that the number of cross linking sites present in the polymer may be in excess of the number utilized in the curing step. On the average, it is preferred to have not more than about one cross linking site per 500 units of molecular weight of polymer.

The polymeric polyurethanes of the present invention may be conveniently cured by the use of a curing procedure involving the use of sulfur. In general, with this method, about 0.5 to 8 parts of sulfur per 100 parts of polymer is necessary to effect the cure in the presence of appropriate accelerators. The uncured polymeric polyurethane may be compounded with the curing agents and it is then stable and may be stored until it is desired to complete the cure, which may be accomplished by the application of heat. Curing at a temperature of about 125 to 160° C. for from one-half to several hours is generally sufficient. It is to be understood that various modifications of the sulfur cure may be employed, depending on the type of polyurethane used. Various procedures and modifications of sulfur curing are more particularly described in Encyclopedia of Chemical Technology, Kirk and Orthmer, published by Interscience Encyclopedia, Inc., New York, 1953, vol. 11, pages 892–927; Principles of High-Polymer Theory and Practice, Schmidt and Marlies, published by McGraw-Hill Book Company, Inc., New York, 1948, pages 556–566; and Chemistry and Technology of Rubber, Davis and Blake, published by Reinhold Publishing Corporation, New York, 1937, vol. 74, chapter VI.

The following examples will better illustrate the nature of the present invention; however, the invention is not intended to be limited to these examples. Parts are by weight unless otherwise indicated.

The stress-strain properties of the elastomers are determined by the conventional methods used in the rubber industry.

*Example 1*

A mixture of 190.6 parts of polytetramethylene-ether glycol having a molecular weight of 953 and 31.2 parts of 4-methyl-3-cyclohexene-1,1-dimethanol is heated and stirred at 80–85° C. until homogeneous and then 69.8 parts of toluene-2,4-diisocyanate is added gradually over a period of 30 minutes. The heating and stirring is continued an additional 30 minutes. The mixture is then poured into a vessel lined with polytetrafluoroethylene, covered, and heated in an oven at 85° C. for four days and at 100° C. for one day. The resultant, moderately tough, resilient polymer has an intrinsic viscosity of 0.80 in a solvent made by mixing 1772 parts of tetrahydrofuran and 285 parts of dimethyl formamide. This polymer has an average molecular weight of 1457 per side chain curing site.

100 parts of the polymer is milled on a rubber roll mill with 30 parts of easy processing channel black, 5 parts of zinc oxide, 2 parts sulfur, 1 part 2-mercaptobenzothiazole, and 1 part tetramethyl thiuram disulfide. The compounded stock is cured in molds in a press for one hour at 134° C.

The properties of the cured elastomer are shown below after conditioning at 50% relative humidity for one day and then immersed in boiling water. The samples immersed in water are removed, dried and conditioned at 50% relative humidity for one day before testing. All tests are at 25° C.

| | Initial | Boiling Water for— | | |
|---|---|---|---|---|
| | | 1 Day | 3 Days | 7 Days |
| Tensile Strength at Break, Lbs./sq. in. | 2,600 | 3,300 | 2,700 | 1,500 |
| Modulus at 300% Elongation, Lbs./sq. in. | 1,100 | 1,400 | 1,500 | 700 |
| Elongation at Break, Percent | 440 | 450 | 400 | 450 |

When the example is repeated using 0.4 mol of 3-cyclohexene-1,1-dimethanol and 0.2 mol of polytetramethyleneether glycol, having a molecular weight of 953, reacted with 0.599 mol of toluene-2,4-diisocyanate, the polymer has an intrinsic viscosity of 0.96. When cured by the same procedure, an elastomer with a tensile strength of 4800 lbs./sq. in. and an elongation of 320% is obtained.

*Example 2*

79.6 parts of 3-(allyloxy)-1,2-propanediol containing 0.5% phenyl-β-naphthylamine as an antioxidant, is stirred with 313.5 parts of toluene-2,4-diisocyanate at 80° C. for 3.5 hours. Analysis for —NCO shows 25.35% compared to a theory of 25.64% —NCO. 100.4 parts of this reaction mass is then mixed with 306 parts of polytetramethyleneether glycol, having a molecular weight of 1020, and heated 4 days at 85° C. This polymer has an average molecular weight of 2650 per side chain curing site.

100 parts of the resultant polymer is milled on a rubber roll mill with 30 parts of high abrasion furnace black, 2.2 parts of sulfur, 2 parts of 2-mercaptobenzothiazole, 6.3 parts of 2,2'-dibenzothiazyl disulfide, and 0.1 part of anhydrous zinc chloride. The compounded polymer is put in molds and cured in a press at 140° C. for 4 hours. The tough, resilient elastomer shows the following properties:

Tensile strength at break, 25° C., lbs./sq. in. _____ 5100
Modulus at 300% elongation, 25° C., lbs./sq. in. ___ 2350
Elongation at break, 25° C., percent _____ 450
Yerzley resilience _____ 72
Shore hardness _____ 70

The heating time of 4 days may be reduced to 1 day without appreciably lowering the intrinsic viscosity. On the other hand, a tertiary amine catalyst reduced the time of reaction markedly. Using, for example, 1% pyridine as a catalyst, the above time of 4 days is reduced to 4 hours at 80–85° C.

*Example 3*

52.8 parts of 3-(methallyloxy)-1,2-propanediol, containing 0.5% phenyl-β-naphthylamine as an antioxidant, and 31.7 parts of toluene-2,4-diisocyanate are stirred together at 80° C. for 4 hours to form a bis-urethane with —OH end groups. Then 156.6 parts of toluene-2,4-diisocyanate is added and stirring continued for 4 hours at 80° C.

101.8 parts of the above diisocyanate mixture and 306 parts of polytetramethyleneether glycol, having a molecular weight of 1020, are stirred together at 80–85° C. for 30 minutes. The mass is poured into a pan lined with polytetrafluoroethylene and baked for 4 days at 85° C. and 1 day at 100° C. This polymer has an average molecular weight of 2670 per chain curing site.

100 parts of the polyurethane so obtained is milled on a rubber roll mill with 30 parts of high abrasion furnace black, 5 parts of zinc oxide, 2 parts sulfur, 1 part stearic acid, 1 part 2-mercaptobenzothiazole and 1 part tetramethyl thiuram disulfide. The compounded stock is cured in molds in a press at 134° C. for 1 hour. The tough, resilient elastomer has a tensile strength at the break (25° C.) of 4300 lbs./sq. in. and an elongation at the break of 450%.

*Example 4*

A mixture of 190.6 parts of polytetramethyleneether glycol, having a molecular weight of 953, and 31.2 parts of 4-methyl-3-cyclohexene-1,1-dimethanol are stirred to homogeneity at 80–85° C. and then 106.7 parts of 3,3'-dimethyl-4,4'-biphenyldiisocyanate is added gradually over a period of 30 minutes. Stirring at 80–85° C. is continued an additional 30 minutes. The mass is then poured into a vessel lined with polytetrafluoroethylene, covered, and baked 4 days at 80–85° C. The resultant polyurethane has an intrinsic viscosity of 1.14 in the tetrahydrofurandimethylformamide solvent. This polymer has an average molecular weight of 1637 per side chain curing site.

100 parts of the polymer is milled on a rubber roll mill with 30 parts of easy processing channel black, 5 parts of zinc oxide, 2 parts of sulfur, 1 part of 2-mercaptobenzothiazole, 1 part of stearic acid and 1 part of tetramethyl thiuram sulfide. The compounded elastomer is cured in molds in a press at 134° C. for 1 hour. The tensile strength at the break (25° C.) is over 5100 lbs./sq. in. and the elongation at the break is 440%.

*Example 5*

116.6 parts of 3 - (allyloxy) - 1,2 - propanediol containing 0.5% phenyl - β - naphthylamine is stirred with 522 parts of toluene - 2,4 - diisocyanate at 50° C. for 20 hours and then at 80° C. for 24 hours.

37.3 parts of this reaction mass is mixed with 375 parts of a polyurethane (made by stirring 3 mols of polytetramethyleneether glycol of molecular weight 924 with 2 mols of toluene - 2,4 - diisocyanate at 100° C. for 3 hours) for 1 hour at 80° C. under nitrogen. The mass is poured into a vessel lined with polytetrafluoroethylene and heated 3 days at 80° C. This polymer has an average molecular weight of 8000 per side chain curing site.

100 parts of the resulting polymer is milled on a rubber roll mill with 40 parts of high abrasion furnace black, 5 parts of zinc oxide, 2 parts sulfur, 1 part 2 - mercaptobenzo thiazole, 1 part of tetramethyl thiuram sulfide and 1 part of stearic acid. The compounded stock is cured in molds at 134° C. for 1 hour. The elastomer has the following properties:

Tensile strength at the break, lbs./sq. in_____ 4700
Modulus at 300% elongation, lbs./sq. in_____ 1480
Elongation at the break, percent_____ 600

Example 6

2088 parts of toluene-2,4-diisocyanate is heated to 65° C. and 397 parts 2 - (allyloxy) - 1,3 - propanediol is added while stirring. The temperature is raised to 80° C. and the mass agitated at 80° C. for 3 hours.

9000 parts of polytetramethyleneether glycol of molecular weight 1038 is put in a vessel at room temperature. 2409 parts of the reaction mass prepared above is added to the vessel with agitation. Agitation is continued for 30 minutes and the temperature is raised to 80° C. The mass is then transferred to a container lined with polyethylene which is then closed and the mass is held at 80° C. without agitation for 72 hours. A rubbery polymer results. The polymer has an average of one allyloxy side chain group for every 3942 units of molecular weight of polymer.

100 parts of the polymer is compounded on a rubber roll mill with 30 parts of high abrasion furnace black, 1 part of sulfur, 4 parts of benzothiazyl disulfide, 1 part of mercaptobenzothiazole and 0.1 part of zinc chloride. The compounded stock is sheeted off the mill, put in molds and cured in a press at 140° C. for 2 hours.

The resulting cured elastomer has the following properties at 25° C.:

Tensile strength at the break, lbs./sq. in_____ 5010
Modulus at 300% elongation, lbs./sq. in_____ 2670
Elongation at the break, percent_____ 430
Shore hardness, A_____ 69

Example 7

To 661 parts of toluene-2,4-diisocyanate at 65° C. is added 83.8 parts of 2-(allyloxy)-1,3-propanediol while agitating. The temperature is then raised to 80° C. and maintained there while stirring for 3 hours.

714 parts of this reaction mass is then added to 3060 parts of polytetramethyleneether glycol of molecular weight 1027 at room temperature, stirred 30 minutes and heated to 80° C. The mass is then poured into a polyethylene-lined container and held at 80° C. for 72 hours without agitation. The resulting polymer has an average of one allyloxy side chain group for every 6310 units of molecular weight of polymer.

100 parts of the polymer is compounded on a rubber roll mill with 30 parts of high abrasion furnace black, 1 part of sulfur, 4 parts of benzothiazyl disulfide, 1 part of mercaptobenzothiazole and 0.1 part of zinc chloride. The compounded stock is sheeted from the mill and cured in molds in a press at 140° C. for 2 hours. The resulting cured elastomer has the following properties at 25° C.:

Tensile strength at the break, lbs./sq. in_____ >5100
Modulus at 300% elongation, lbs./sq. in_____ 1980
Elongation at the break, percent_____ 520
Shore hardness, A_____ 67

Example 8

(a) 2 - [(allyloxy)methyl] - 2 - methyl - 1,3 propanediol is prepared by placing 1000 parts of trimethylolethane, 1000 parts of methylethyl ketone, 400 parts of benzene and 2 parts of p-toluene sulfonic acid in an agitated vessel equipped with a fractionating column and a water separator and refluxing for 40 hours, during which time the theoretical amount of water is removed to form the corresponding hydroxy ketal.

2 parts of sodium acetate is then added while refluxing is continued an additional 30 minutes. The water separator is replaced with a fractionating head and the solvents are distilled off and then the hydroxy ketal is distilled over at 14 mm. of mercury pressure at 125° C.

The ketal has the formula

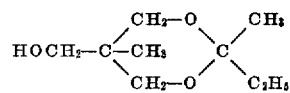

It has a refractive index $n_D^{25}$ 1.4559.

The sodium salt of the hydroxy ketal is prepared by dispersing 82 parts of sodium in 400 parts of toluene by rapid stirring at 110° C. under an atmosphere of nitrogen and then adding gradually over a period of about 20 minutes 620 parts of hydroxy ketal. The rather violent exothermic reaction supplies enough heat to maintain the toluene at the reflux. After the addition is complete, refluxing is continued for about 10 minutes by applying heat. The product is a light yellow liquid which does not freeze when cooled to 70° C.

To the solution of sodium salt of the hydroxy ketal prepared above is added 445 parts of allyl bromide over a period of 25 minutes at a temperature ranging from 119° C. at the start to 127° C. at the end, the toluene being at the reflux. Refluxing is then continued for an hour. The mass is cooled to 50° C., 500 parts of water is stirred in, and then the layers are allowed to separate. The toluene layer is recovered, dried and fractionated. The allyloxy ketal boils at 113° C. at 14 mm. of mercury pressure and has a refractive index $n_D^{25}$ 1.4460. Analysis shows C—67.7%, H—10.5%; theory C—67.3%, H—10.4%.

To 225 parts of the ketal (2-methyl-2-ethyl-5-allyloxymethyl-5-methyl-1,3-dioxane) is added 0.2 part of p-toluene sulfonic acid and 50 parts of water. The mass is stirred and heated to the boil and becomes homogeneous. The theoretical amount of methylethyl ketone-water azeotrope is distilled off. The mass is cooled, 0.2 part of sodium acetate is added and the glycol is distilled off. The 2-[(allyloxy)methyl]-2-methyl-1,3 propanediol boils at 140° C. at 13 mm. of mercury pressure. It has a refractive index $n_D^{25}$ 1.4628. Analysis shows: C—59.85%, H—10.2%, OH No. 701; theory, C—59.95%, H—10.1%, OH No. 700.

(b) 160 parts of 2-[(allyloxy)methyl]-2-methyl-1,3 propanediol, 2000 parts of dry polytetramethyleneether glycol of molecular weight 1000 and 522 parts of toluene-2,4-diisocyanate are stirred together and heated at 90° C. for 1 hour. The mass is transferred to a polyethylene-lined container which is then closed and held at 80° C. for 72 hours. The resulting polymer has an average of one allyloxymethyl side chain group for every 2682 units of molecular weight of polymer.

100 parts of the polymer is compounded on a rubber roll mill with 30 parts of high abrasion furnace black, 3 parts of sulfur, 6 parts of benzothiazyl disulfide, 1 part of mercaptobenzothiazole and 0.4 part of zinc p-methoxy-dithiocarbanilate. The mass is sheeted off the mill, put in molds and cured in a press for 1 hour at 140° C. The resulting elastomer has the following properties at 25° C.

Tensile strength at the break, lbs./sq. in_____ 5100
Modulus at 300% elongation, lbs./sq. in_____ 4000
Elongation at the break, percent_____ 330

The Goodrich flexometer test on a pellet using a load of 200 lbs. per sq. in. and a ¼ inch stroke shows a temperature of 170° C. in the center after 20 minutes and there is no sign of cavitation in the pellet.

(c) The zinc p-methoxydithiocarbanilate which is used in the curing procedure above is prepared by slowly adding a solution of 10 parts of p-anisidine in 16 parts of methanol to an agitated mixture of 22 parts of concentrated ammonium hydroxide and 7.5 parts of carbon disulfide while the temperature is maintained between 0° C. and 10° C. Stirring at this temperature is continued for 1.5 hours after the addition is complete. A precipitate of ammonium p-methoxydithiocarbanilate is formed. The solid is filtered from the cold solution and washed with 7 parts of ice water. The nearly dry filter cake is dissolved in 380 parts of water and 0.8 part of activated charcoal is added and the mass is filtered. To the resulting clear yellow solution is added 6 parts of zinc chloride dissolved in 2.5 parts of water while agitating vigorously and stirred for 30 minutes longer. A white precipitate of zinc p-methoxy dithiocarbanilate forms which is filtered off. The filter cake is washed with water and then dried in a circulating air oven at 50° C. 14 parts of zinc p-methoxydithiocarbanilate is obtained.

Example 9

4000 parts of polytetramethyleneether glycol of molecular weight 1000, 145 parts of 2,2'-(allylimino)-diethanol, and 870 parts of toluene-2,4-diisocyanate are mixed at room temperature. The mass is then transferred to a polyethylene-lined container and held at 50° C. without agitation for 24 hours and then at 75° C. for 24 hours. The polymer has an average of one allyl side chain per 5096 units of molecular weight of polymer.

100 parts of the polymer is compounded on a rubber roll mill with 30 parts of high abrasion furnace black, 4 parts of sulfur, 8 parts of benzothiazyl disulfide, and 2 parts of mercaptobenzothiazole. The compounded stock is sheeted from the mill and cured in molds in a press at 140° C. for 1 hour. The cured elastomer has the following properties at 25° C.:

Tensile strength at the break, lbs./sq. in_____ 3850
Modulus at 300% elongation, lbs./sq. in_____ 1000
Elongation at the break, percent_____ 625
Shore hardness, A_____ 62

Example 10

(a) 2,2'-(4-allyl-m-phenylenedioxy)diethanol is prepared by adding 121 parts of allyl bromide at a uniform rate over a period of about 2.5 hours to an agitated, refluxing mixture of 110 parts of resorcinol, 138 parts of potassium carbonate and 160 parts of acetone. The mixture is refluxed and stirred for 4 hours after addition is complete. The mixture is then cooled and filtered and the residue washed with acetone. The acetone is distilled off under vacuum. The oily residue is dissolved in carbon tetrachloride and washed twice with water to remove unreacted resorcinol. The carbon tetrachloride layer is then shaken with 10% sodium hydroxide solution, the aqueous layer removed and acidified with dilute hydrochloric acid. It is then extracted with ether and the ether layer is washed with water until the washings are neutral, dried over anhydrous sodium sulfate, and then distilled off. The residue is distilled under vacuum. 68 parts of the monoallyl ether of resorcinol is obtained, distilling at 110–122° C. at 0.8 mm. of mercury pressure.

187 parts of resorcinol monoallylether is mixed with 500 parts of dimethylaniline and refluxed for 3 hours under nitrogen. The dimethylaniline is removed under vacuum and the residue distilled under vacuum, 165 parts of 4-allyl resorcinol being obtained at 109–126° C. at 1 mm. of mercury pressure.

150 parts of 4-allyl resorcinol, 136 parts of sodium ethoxide, 240 parts of ethylene chlorhydrin, and 1200 parts of ethanol are refluxed for 3.5 hours. Most of the alcohol is evaporated under vacuum. The residue is stirred with a mixture of ether and water and the ether layer separated. The ether layer is made alkaline with 10% sodium hydroxide solution and then washed with water until neutral. The ether layer is then dried over anhydrous sodium sulfate and the ether evaporated. The residue is distilled under vacuum and the fraction boiling at 173–189° C. at 0.4 mm. of mercury pressure is collected. The distillate is recrystallized from petroleum ether, yielding 53 parts. The 2,2'-(4-allyl-m-phenylenedioxy)diethanol has the following analysis: C—65.6%, H—7.75%, OH No. 471; theory, C—65.5%, H—7.6%, OH No. 470.8.

(b) 119 parts of 2,2'-(4-allyl-m-phenylenedioxy)-diethanol and 261 parts of toluene-2,4-diisocyanate are stirred together at 80° C. for 2.5 hours. Then 1000 parts of polytetramethyleneether glycol of molecular weight 1000 is added and thoroughly stirred in. The mass is transferred to a polyethylene-lined container which is then closed and held at 80° C. without agitation for 72 hours. The resulting rubbery polymer has an average of one allyl side chain group per 2760 units of molecular weight of polymer.

100 parts of the polymer is compounded on a rubber roll mill with 30 parts of high abrasion furnace black, 2 parts of benzothiazyl disulfide, 1 part of sulfur, 1 part of mercaptobenzothiazole, and 0.8 part of zinc p-methoxydithiocarbanilate. The compounded stock is sheeted off the mill and cured in molds in a press at 140° C. for 90 minutes.

The cured elastomer has the following properties at 25° C. and 70° C.:

|  | 25° C. | 70° C. |
| --- | --- | --- |
| Tensile strength at break, lbs./sq. in___ | 3,500 | 1,900 |
| Modulus at 300% elongation, lbs./sq. in_____ | 2,500 | 1,900 |
| Elongation at break, percent_____ | 325 | 300 |
| Shore hardness, A_____ | 70 | |

Example 11

(a) 3-(o-allylphenoxy)-1,2-propanediol is prepared by dissolving 450 parts of o-allylphenol in a solution of 201 parts of sodium hydroxide in 1140 parts of water. To this solution at 25° C. is added 388 parts of epichlorhydrin. The mixture is stirred vigorously for 12 hours. The water-immiscible oil formed is extracted with ether and the ether layer is washed with water, dried and the ether removed under vacuum. The residue is distilled under vacuum and 442 parts of o-allylphenyl glycidyl ether is obtained at 102–110° C. at 1 mm. of mercury pressure.

207 parts of o-allylphenyl glycidyl ether, 915 parts of tetrahydrofuran, 195 parts of water and 8.3 parts of sulfuric acid are stirred together until a homogeneous solution forms. Agitation is then stopped and the mass allowed to stand for a total reaction time of 24 hours. The water is salted out by adding sodium hydroxide pellets, the tetrahydrofuran layer is separated and the tetrahydrofuran removed under vacuum. The residue is distilled and 125 parts of 3-(o-allylphenoxy)-1,2-propanediol is obtained. It is recrystallized from petroleum ether/benzene. Analysis shows the following: C—69.2%, H—7.7%, OH No. 536.1, as compared to a theory of C—69.2%, H—7.7%, OH No. 538.

(b) 104 parts of 3-(o-allylphenoxy)-1,2-propanediol is mixed with 261 parts of toluene-2,4-diisocyanate and heated at 80° C. for 2.5 hours while agitating. Then 1000 parts of polytetramethyleneether glycol of molecular weight 1000 is thoroughly stirred in. The mass is transferred to a polyethylene-lined container and held at 80° C. for 72 hours without agitation. The resulting rubbery polyurethane has an average of one allyl side chain group for every 2730 units of molecular weight of polymer.

100 parts of the polymer is compounded on a rubber roll mill with 30 parts of high abrasion furnace black, 2 parts of benzothiazyl disulfide, 1 part of mercaptobenzothiazole, 1 part of sulfur and 0.8 part of zinc p-methoxydithiocarbanilate. The compounded stock is sheeted off the mill and cured in molds in a press at 140° C. for 90 minutes.

The cured elastomer shows the following properties at 25° C. and at 70° C.:

|  | 25° C. | 70° C. |
|---|---|---|
| Tensile strength at break, lbs./sq. in | 5,000 | 3,100 |
| Modulus at 300% elongation, lbs./sq. in | 1,950 | 1,400 |
| Elongation at break, percent | 490 | 520 |
| Shore hardness, A | 70 | |

*Example 12*

(a) 3-(4-allyl-2-methoxyphenoxy)-1,2-propanediol is prepared by the same synthesis procedure as the 3-(o-allylphenoxy)-1,2-propanediol of Example 11(a), starting with eugenol instead of o-allylphenol. The eugenyl glycidyl ether distills at 132–145° C. at 1 mm. pressure and the 3-(4-allyl-2-methoxyphenoxy)-1,2-propanediol distills at 165–181° C. at 1 mm. Analysis shows: C—65.7% compared to a theory of 65.5%.

(b) 239 parts of 3-(4-allyl-2-methoxyphenoxy)-1,2-propanediol is stirred with 522 parts of toluene-2,4-diisocyanate at 80° C. for 2.5 hours. Then 2000 parts of polytetramethyleneether glycol of molecular weight 1000 is thoroughly stirred in. The mass is transferred to a polyethylene-lined container and held at 80° C. for 72 hours without agitation. The resulting rubbery polyurethane has an average of one allyl side chain group for each 2761 units of molecular weight of polymer.

100 parts of the polymer is compounded on a rubber roll mill with 30 parts of high abrasion furnace black, 2 parts of benzothiazyl disulfide, 1 part of mercaptobenzothiazole, 1 part of sulfur and 0.8 part of zinc p-methoxydithiocarbanilate. The compounded stock is sheeted off the mill and cured in molds in a press at 140° C. for 90 minutes. The cured elastomer shows the following properties at 25° C. and 70° C.:

|  | 25° C. | 70° C. |
|---|---|---|
| Tensile strength at break, lbs./sq. in | 4,800 | 2,500 |
| Modulus at 300% elongation, lbs./sq. in | 1,850 | 1,250 |
| Elongation at break, percent | 540 | 530 |
| Shore hardness, A | 70 | |

*Example 13*

(a) The 3-(o-propenylphenoxy)-1,2-propanediol is prepared in the same manner as the 3-(o-allylphenoxy)-1,2-propanediol in Example 11(a), starting with o-propenylphenol. Analysis shows: C—69.2%, H—7.7%, OH No. 537.5, as compared to a theory of C—69.2%, H—7.7%, OH No. 538.

(b) 104 parts of 3-(o-propenylphenoxy)-1,2-propanediol is mixed with 261 parts of toluene-2,4-diisocyanate and heated at 80° C. for 2.5 hours while agitating. Then 1000 parts of polytetramethyleneether glycol of molecular weight 1000 is thoroughly mixed in. The mass is transferred to a polyethylene-lined container and held at 80° C. for 72 hours without agitation. The resulting rubbery polyurethane has an average of one propenyl side chain group for every 2730 units of molecular weight of polymer.

100 parts of the polymer is compounded on a rubber roll mill with 30 parts of high abrasion furnace black, 2 parts of benzothiazyl disulfide, 1 part of mercaptobenzothiazole, 1 part of sulfur and 0.8 part of zinc p-methoxydithiocarbanilate. The compounded stock is sheeted off the mill and cured in molds in a press at 150° C. for 90 minutes. The cured elastomer shows the following properties at 25° C.:

| Tensile strength at break, lb./sq. in | 3700 |
|---|---|
| Modulus at 300% elongation, lbs./sq. in | 1500 |
| Elongation at break, percent | 500 |
| Shore hardness, A | 65 |

*Example 14*

To 97.8 parts of toluene-2,4-diisocyanate is added 24.8 parts of 3-allyloxy-1,2-propanediol. The mass is blanketed with nitrogen and heated at 80° C. for 3 hours while agitating. The above mass is then added to 375 parts of dry polytetramethyleneether glycol of molecular weight 1000 at 40–45° C. and agitated under a blanket of nitrogen for 1 hour. The mass is transferred to a Werner-Pfleiderer mixer and heated to 80–85° C. Then 10 parts of polyethylene is added. The agitation is started and 2.88 parts of triethylamine is added. The temperature rises and cooling water is turned on the jacket of the mixer. After about 45 minutes, the temperature reaches 150° C. The agitation is stopped and a stream of nitrogen is passed through the mixer to remove triethylamine vapors. The polymer is then transferred to a rubber roll mill and milled for 10 minutes to complete the removal of triethylamine. The polymer is then sheeted off the mill. This polymer has an average molecular weight of 2654 per side chain curing site.

100 parts of the polymer is compounded on a rubber roll mill with 30 parts of high abrasion furnace black, 2 parts of sulfur, 4 parts of benzothiazyl disulfide, 1 part 2-mercaptobenzothiazole and 0.4 part of zinc p-methoxy dithiocarbanilate containing 10% zinc chloride. The stock is sheeted off the mill. It is cured in molds in a press at 140° C. for 1 hour. The cured elastomer shows the following properties at 25° C.:

| Tensile strength at break, lbs./sq. in | 4750 |
|---|---|
| Modulus at 300% elongation, lbs./sq. in | 3000 |
| Elongation at break, percent | 420 |
| Shore hardness, A | 70 |

The elastomers prepared according to this invention have many varied uses. They may be employed in the preparation of tires, inner tubes, belts, hose and tubing, wire and cable jackets, footwear, sponges, coated fabrics, and a wide variety of coated or molded articles. They are characterized by good thermal stability properties and by a number of other advantageous properties, including excellent resistance to direct sunlight, oxygen and ozone, oil and other hydrocarbon solvents. They display unusually outstanding resistance to mechanical abrasion and to deterioration caused by flexing, stretching and the like. These elastomers exhibit resistance to boiling water. The uncured but compounded polymer is not affected by moisture and can be stored for lengthy periods before shaping and vulcanizing.

The elastomeric properties of these materials may be varied by suitable compounding. The amount and type of compounding agent to be incorporated in the stock is dependent upon the use for which the elastomer is intended. The compounding agents ordinarily used in the rubber industry with either natural or synthetic rubber are useful with the products of this invention. These include carbon black, clay, silica, esterified silica particles, talc, zinc and magnesium oxides, calcium and magnesium carbonate, titanium dioxide, and plasticizers. Inorganic and organic coloring agents may be incorporated to give well-defined colors, as the natural color of these elastomers is a pale yellow or light amber.

This application is a continuation-in-part of copending application Serial No. 526,566, filed August 4, 1955, now abandoned.

As many widely different embodiments of this invention may be made without departing from the spirit and scope thereof, it is to be understood that this invention is not limited to the specific embodiments thereof except as defined in the appended claims.

What is claimed is:

1. Polymeric polyurethanes consisting essentially of the recurring structural units

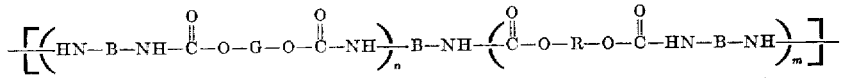

wherein O—G—O is a bivalent radical resulting from removal of the terminal hydrogen atoms from a polymeric glycol having a molecular weight of at least 750 and being selected from the group consisting of polyalkyleneether glycols, polyalkyleneether-thioether glycols, polyalkylene-arylene-ether glycols, and polyalkylene-aryleneether-thioether glycols; B is a bivalent organic radical, said radical being inert to isocyanate groups; O—R—O is a bivalent radical resulting from removal of the terminal hydrogen atoms from a non-polymeric glycol; $n$ is an integer greater than zero; $m$ is an integer including zero; each of the structural units being connected to the next by a radical selected from the group consisting of

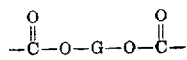

and

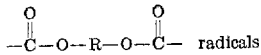 radicals wherein O—G—O and O—R—O have the significance defined above; with at least 60% of the total weight of the polymer being the bivalent radicals O—G—O; with the proviso that at least one of the bivalent O—G—O, B and O—R—O radicals have a side chain containing an aliphatic

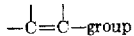 group with the remaining valences on the carbon atoms of said group being satisfied by monovalent substituents, said side chain occurring at least once for every 8000 units of molecular weight of said polymeric polyurethane.

2. Polymeric polyurethanes consisting essentially of the recurring structural units

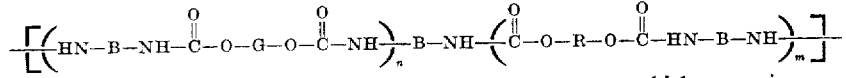

wherein O—G—O is a bivalent radical resulting from removal of the terminal hydrogen atoms from a polymeric glycol having a molecular weight of at least 750 and being selected from the group consisting of polyalkyleneether glycols, polyalkyleneether-thioether glycols, polyalkylene-arylene-ether glycols, and polyalkylene-arylene-ether-thioether glycols; B is a bivalent organic radical, said radical being inert to isocyanate groups; O—R—O is a bivalent radical resulting from revomal of the terminal hydrogen atoms from a non-polymeric glycol; $n$ is an integer greater than zero; $m$ is an integer including zero; each of the structural units being connected to the next by a radical selected from the group consisting of

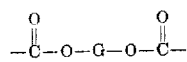

and

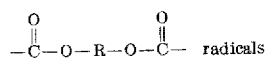 radicals wherein O—G—O and O—R—O have the significance defined above; with at least 60% of the total weight of the polymer being the bivalent radicals O—G—O; with the proviso that at least one of the bivalent O—G—O, B and O—R—O radicals contain a side chain bearing a terminal aliphatic —CH=CH$_2$ group, said side chain occurring at least once for every 8000 units of molecular weight of said polymeric polyurethane.

3. The polymer of claim 1 wherein the bivalent radical O—G—O is obtained by removing the terminal hydrogen atoms from a polyalkyleneether glycol.

4. The polymer of claim 3 wherein the polyalkyleneether glycol is a polytetramethyleneether glycol.

5. The polymer of claim 3 wherein the bivalent organic radical B is an arylene radical.

6. The polymer of claim 4 wherein the bivalent organic radical B is an arylene radical.

7. The polymer of claim 5 wherein the bivalent radical O—R—O is obtained by removing the terminal hydrogens from a propanediol.

8. The polymer of claim 6 wherein the bivalent radical O—R—O is obtained by removing the terminal hydrogens from a propanediol having a side chain bearing an aliphatic

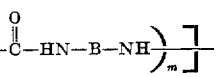 group with the remaining valences on the carbon atoms of said group being satisfied by monovalent substituents.

9. The polymer of claim 3 wherein the polyalkyleneether glycol is a polypropyleneether glycol.

10. The polymer of claim 1 wherein the bivalent radical O—G—O is obtained by removing the terminal hydrogen atoms from a polyalkyleneether-thioether glycol.

11. The polymer of claim 8 wherein the propanediol is a 1,3-propanediol.

12. The polymer of claim 11 wherein the 1,3-propanediol is 2-[(allyloxy)methyl]-2-methyl-1,3-propanediol.

13. The polymer of claim 8 wherein the propanediol is 3-(allyloxy)-1,2-propanediol.

14. A cured elastomer obtained by heating the polymeric polyurethanes of claim 1 to a temperature of at least about 125° C. with sulfur in the presence of vulcanization accelerators.

15. The process of preparing a polymeric polyurethane

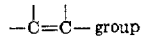

which comprises reacting a polymeric glycol having a molecular weight of at least 750 and being selected from the group consisting of polyalkyleneether glycols, polyalkyleneether - thioether glycols, polyalkylene-arylene-ether glycols, and polyalkylene-aryleneether-thioether glycols, with an organic diisocyanate and a non-polymeric glycol; with the proviso that at least one of said reactants have a side chain containing an aliphatic

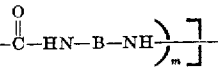 group with the remaining valences on the carbon atoms of said group being satisfied by monovalent substituents, the proportions of reactants being selected so that said side chain occurs at least once for every 8000 units of molecular weight of the resulting polymeric polyurethane.

16. The process of claim 15 wherein the polymeric glycol is a polyalkyleneether glycol.

17. The process of claim 16 wherein the polyalkyleneether glycol is a polytetramethyleneether glycol.

18. The process of claim 16 wherein the organic diisocyanate is an arylene diisocyanate.

19. The process of claim 17 wherein the organic diisocyanate is toluene-2,4-diisocyanate.

20. The process of claim 18 wherein the non-polymeric glycol is a propanediol.

21. The process of claim 19 wherein the non-polymeric glycol is 2-[(allyloxy)methyl]-2-methyl-1,3-propanediol.

References Cited in the file of this patent

UNITED STATES PATENTS 2,702,797    Rugg   ---------------- Feb. 22, 1955

UNITED STATES PATENT OFFICE
CERTIFICATE OF CORRECTION

Patent No. 2,808,391

October 1, 1957

Dexter B. Pattison

It is hereby certified that error appears in the printed specification of the above numbered patent requiring correction and that the said Letters Patent should read as corrected below.

Column 6, line 30, for "4.4'-" read -- 4,4'- --; column 10, lines 13 and 14, for "solovents" read -- solvents --; column 15, line 54, for "revomal" read -- removal --; column 16, line 13, for "an arylene radical" read -- a 2,4-tolylene radical --.

Signed and sealed this 19th day of November 1957.

(SEAL)
Attest:

KARL H. AXLINE
Attesting Officer

ROBERT C. WATSON
Commissioner of Patents